Nov. 21, 1933.      F. H. ENGELKE      1,936,295
ANTICLOG STOCK FEEDER
Filed May 24, 1932
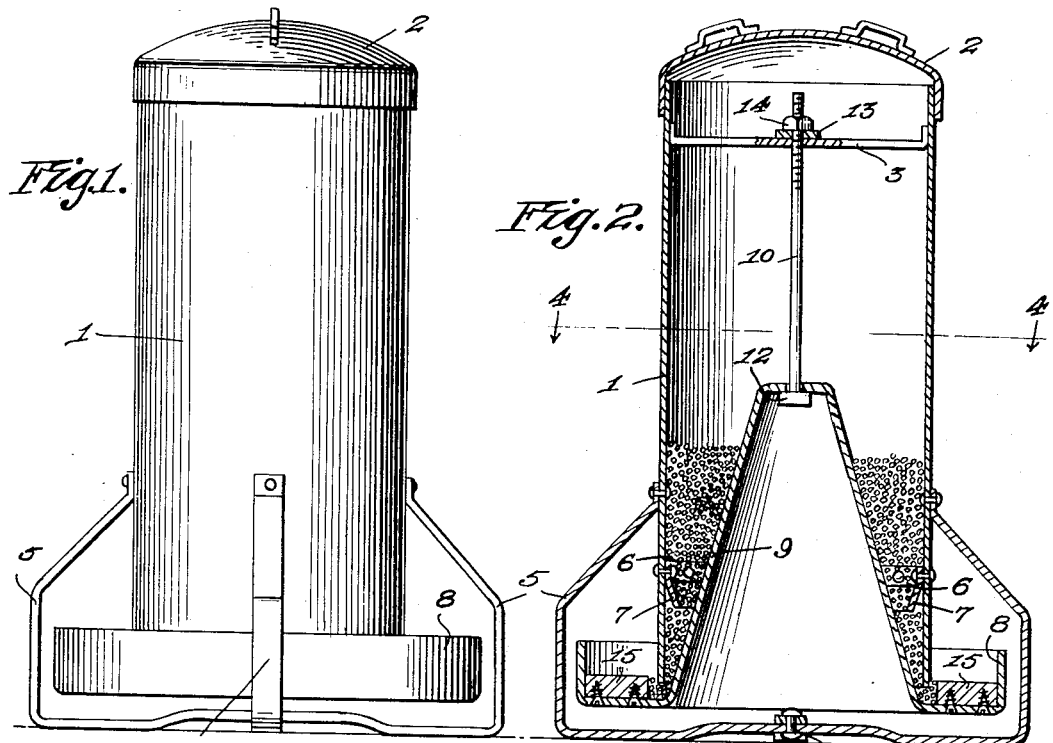
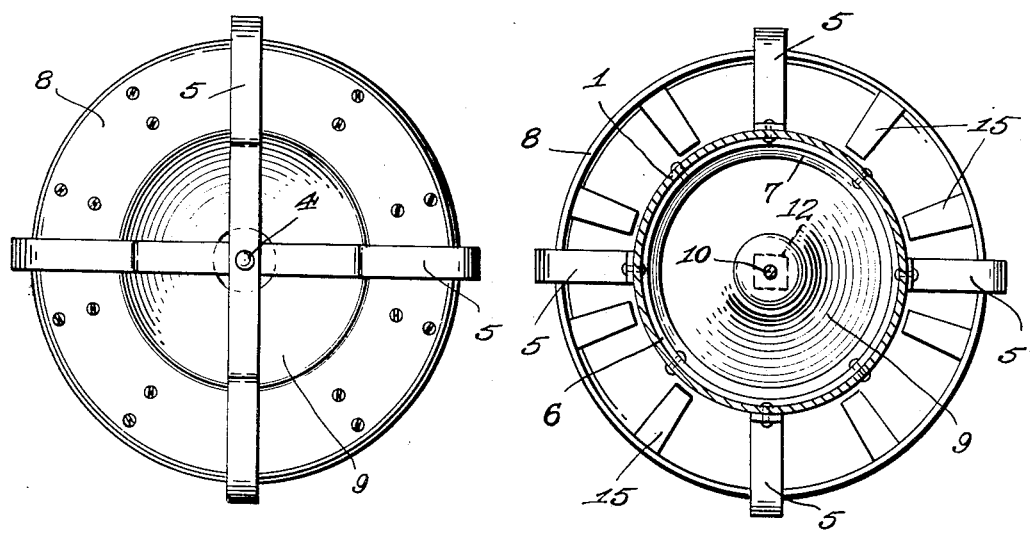
F. H. Engelke,
INVENTOR
BY Victor J. Evans & Co.
ATTORNEY Patented Nov. 21, 1933

1,936,295

UNITED STATES PATENT OFFICE 1,936,295

ANTICLOG STOCK FEEDER

Fred H. Engelke, Marshfield, Wis.

Application May 24, 1932. Serial No. 613,254

3 Claims. (Cl. 119—54)

My present invention has reference to an animal feeder, and among the objects of the invention is the provision of a feeder in which grain of different sizes will be caused to flow in an easy and steady manner from the hopper to the trough of the improvement; one in which a baffle plate is arranged in the hopper in cooperative relation to a distributing or equalizing member that is centrally formed with the pan or trough of the feeder, one in which the distance between the hopper and the trough may be regulated to compensate for the quantity of the grain delivered from the hopper into the trough, and one in which the flow of feed from the hopper to the trough is controlled by the routing of the animals in the trough.

The invention will be fully and comprehensively understood from a consideration of the following detailed description when read in connection with the accompanying drawing which forms part of the application, with the understanding, however, that the improvement is capable of extended application and is not confined to the exact showing of the drawing nor to the precise construction described, and, therefore, such changes and modifications may be made therefrom as do not affect the spirit of the invention nor exceed the scope thereof as expressed in the appended claims.

In the drawing:

Figure 1 is a side elevation of an animal feeder in accordance with this invention.

Figure 2 is an approximately central transverse sectional view therethrough.

Figure 3 is a bottom plan view.

Figure 4 is a horizontal sectional view approximately on the line 4—4 of Figure 1.

As disclosed by the drawing I make use of a tubular hopper 1 of a size to contain a desired quantity of grain or like stock feed therein. The open top of the hopper 1 is closed by a flange cover 2 and the said hopper, below its upper open end has fixed thereon the ends of a cross bar 3 whose purpose will presently be described. The hopper is supported on an open base, the same being preferably constructed of strap irons, the bottom portions of which centrally cross each other and being riveted or otherwise connected, as at 4. Each of the bottom members has its outer end extended upwardly, as at 5, and from thence inclined inwardly and connected to the sides of the hopper. The strap irons are arranged at a right angle with respect to each other and the hopper is thereby supported a suitable distance above the ground surface.

In the hopper at a suitable distance from its lower end there is fixed a ring member 6 that has a lower inwardly inclined or tapered portion 7 and the part 7 affords a feed baffle as will hereinafter be understood. Arranged in the supporting base for the hopper and below the outlet end of said hopper there is a disc 8 that has its outer periphery provided with an upstanding flange. The disc and its flange provides the feed trough. The trough 8 has centrally secured to its inner periphery a hollow conical projecting member 9. The conical member 9 is in the nature of a grain distributor or equalizer and the closed top of the said member 9 has loosely passed therethrough a headed rod 10. The head 12 of the rod 10 contacts with the inner face or wall of the top of the cone-shaped member 9 and affords a suspending means or support for the said member 9 and for the trough 8. These members 9 and 8 are both revolubly and swingably mounted on the rod 10, but the swinging movement of the said members is limited by the contact of the member 9 with the baffle 7. The upper or outer end of the rod 10 is threaded and passes through an opening in the bar 3 as well as through a washer 13 that rests on the said bar 3. This end of the rod is engaged by a nut 14 which contacts with the washer 13. By removing the cover 2 the nut 14 may be turned to adjust the rod and thereby bring the widened and lower end of the conical member 9 toward or away from the lower outlet end of the hopper 1. This also regulates the distance between the outer wall of the member 9 and the baffle ring 7.

In the bottom of the trough and in contact with the outer flanged wall thereof there are fixed at equidistantly spaced intervals blocks 15. The grain from the hopper flows between these blocks, and the routing of the animals in the trough will bring their snouts or muzzles against the blocks to impart a turning movement to the trough and the conical member 9 and thus agitate the feed in the trough to cause the same to flow from the hopper into the trough at desired intervals.

The baffle ring 7 provides an anti-clogging device for the feed in the hopper, the outflow of feed from the hopper is regulated in a manner as previously described, and the feed in the hopper is agitated by the rotary movement of the trough incident to the routing of the animal.

Having described the invention, I claim:

1. A stock feeder comprising a hopper having a lower open end, a substantially conical shaped grain distributor extending upwardly in the hopper from the lower end thereof, a feed pan integral with the lower end of the distributor and underlying the open lower end of the hopper, a suspending rod loosely and rotatably connected to the upper end of the distributor, means detachably and adjustably connecting the rod to the upper portion of the hopper, and means supporting the hopper from the ground.

2. A stock feeder comprising a hopper having a lower open end, a substantially conical shaped grain distributor extending upwardly in the hopper from the lower end thereof, a feed pan integral with the lower end of the distributor and underlying the open lower end of the hopper, a suspending rod loosely and rotatably connected to the upper end of the distributor, means detachably and adjustably connecting the rod to the upper portion of the hopper, a ring secured to the interior of the hopper about the distributor and having a conical shaped portion inclining towards the outer face of the distributor, and means supporting the hopper from the ground.

3. A stock feeder comprising a hopper having a lower open end, a substantially conical shaped grain distributor extending upwardly in the hopper from the lower end thereof, a feed pan integral with the lower end of the distributor and underlying the open lower end of the hopper, a suspending rod loosely and rotatably connected to the upper end of the distributor, means detachably and adjustably connecting the rod to the upper portion of the hopper, a ring secured to the interior of the hopper about the distributor and having a conical shaped portion inclining towards the outer face of the distributor, and a plurality of intercrossing and connected strips forming a base and underlying the feed pan and hopper and extending upwardly and inwardly in spaced relation and secured to the hopper.

FRED H. ENGELKE.